United States Patent [19]

Jackson et al.

[11] Patent Number: 5,374,443
[45] Date of Patent: * Dec. 20, 1994

[54] METHOD FOR MANUFACTURE OF A LOW-FAT CHEESE

[75] Inventors: Linda K. Jackson, Lake Forest; Deanna M. Brown; Yeong-Ching A. Hong, both of Buffalo Grove, all of Ill.; John J. Standholm, Green Bay, Wis.

[73] Assignee: Kraft General Foods, Inc., Northfield, Ill.

[*] Notice: The portion of the term of this patent subsequent to Dec. 15, 2009 has been disclaimed.

[21] Appl. No.: 40,883

[22] Filed: Mar. 31, 1993

[51] Int. Cl.$^5$ .............................................. A23C 19/00
[52] U.S. Cl. ..................................... 426/582; 426/36; 426/658; 426/804
[58] Field of Search .............. 426/36, 582, 34, 36, 426/580, 658, 661, 804

[56] References Cited

U.S. PATENT DOCUMENTS

| | | | |
|---|---|---|---|
| 4,166,142 | 8/1979 | Chang | 426/582 |
| 4,748,041 | 5/1988 | Player et al. | 426/601 |
| 5,061,504 | 10/1991 | Kong-Chan et al. | 426/582 |
| 5,064,660 | 11/1991 | Silver | 426/36 |
| 5,079,024 | 1/1992 | Crane | 426/573 |
| 5,215,778 | 6/1993 | Davison et al. | 426/582 |
| 5,234,707 | 8/1993 | Merkenich et al. | 426/582 |
| 5,236,719 | 8/1993 | Meyers et al. | 426/3 |

FOREIGN PATENT DOCUMENTS

| | | |
|---|---|---|
| 166362 | 1/1986 | European Pat. Off. |
| 237992 | 9/1987 | European Pat. Off. |
| 9102461 | 3/1991 | WIPO |

*Primary Examiner*—Donald E. Czaja
*Assistant Examiner*—Leslie Wong
*Attorney, Agent, or Firm*—Fitch, Even, Tabin & Flannery

[57] ABSTRACT

The present invention is directed to a low-fat processed cheese manufactured from skim milk cheese. In the method of the invention, a mixture of skim milk cheese, a low viscosity bulking agent and an emulsifying salt is provided. The mixture is heated to an elevated temperature of from about 175° F. to about 240° F. The mixture is held at the elevated temperature for a period of from about 0.5 minutes to about 8 minutes to provide a homogeneous molten cheese mass. The cheese mass is then packaged to provide a low fat processed cheese. The low-fat processed cheese of the invention is particularly suitable for the manufacture of processed cheese slices.

7 Claims, No Drawings

METHOD FOR MANUFACTURE OF A LOW-FAT CHEESE

FIELD OF THE INVENTION

The present invention is directed to a high non-fat processed cheese and to a method for manufacture thereof. More particularly, the invention is directed to a processed cheese which is prepared from skim milk cheese and a low viscosity bulking agent to provide a non-fat processed cheese which is similar in body and texture to processed cheese products prepared from natural cheese

BACKGROUND OF THE INVENTION

Processed cheese products containing a substantial level of fat are well known in the food industry and Standards of Identity have been established by the United States Food and Drug Administration for several types of processed cheese products.

In accordance with the Standards of Identity, pasteurized processed cheese is the food prepared by comminuting and mixing, with the aid of heat, one or more natural cheeses of the same or two or more varieties. Specifically excluded from use in the preparation of pasteurized processed cheese, however, are cream cheese, natural cheese, cottage cheese, low fat cottage cheese, cottage cheese dry curd, cooked cheese, hard grating cheese, semisoft part-skim cheese, part-skim spice cheese and skim milk cheese. The pasteurized processed cheese is prepared by heating the natural cheese with an emulsifying agent while mixing into a homogeneous plastic mass. During its preparation, pasteurized processed cheese is heated for not less than 30 seconds at a temperature of not less than 150° F. The moisture content of pasteurized processed cheese cannot be more than 43%, except that the moisture content of pasteurized process washed curd cheese or pasteurized process colby cheese cannot be more than 40%. The moisture content of pasteurized process Swiss cheese or pasteurized process Gruyere cheese is not more than 44%. The moisture content of pasteurized process Limburger cheese is not more than 51%.

The fat content (dry basis) of pasteurized processed cheese cannot be less than 47% except that the fat content of pasteurized process Swiss cheese is not less than 43% and the fat content of pasteurized process Gruyere cheese is not less than 45%.

The emulsifying agents prescribed for use in the manufacture of pasteurized process cheese are one or any mixture of two or more of the following: monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, and sodium potassium tartrate.

Pasteurized process cheese food is prepared in a manner similar to that of pasteurized processed cheese except that the moisture content is not more than 44% and the fat content is not less than 23%. For pasteurized processed cheese food, addition of cream, milk, skim milk, buttermilk, cheese whey and any of the foregoing from which part of the water has been removed can be used. Anhydrous milkfat, dehydrated cream, albumin from cheese whey and skim milk cheese can also be used in pasteurized processed cheese food. The same emulsifying agents permitted in the manufacture of pasteurized processed cheese can also be used in the manufacture of pasteurized processed cheese food.

Pasteurized process cheese spread is prepared in a manner similar to pasteurized processed cheese and pasteurized processed cheese food. The moisture content of a pasteurized processed cheese spread is more than 44%, but not more than 60%, and the fat content is not less than 20%. The same emulsifying agents can be used. In addition, the use of gums is permitted in the manufacture of pasteurized processed cheese spread. The gums can be selected from the group consisting of carob bean gum, gum karaya, gum tragacanth, guar gum, gelatin, sodium carboxymethyl cellulose, carrageenan, oat gum, sodium alginate, propylene glycol alginate and xanthan gum. The total weight of the gums cannot be more than 0.8% of the weight of the finished pasteurized processed cheese spread.

The above described processed cheese products have a body and texture such that they are either sliceable or spreadable. It would be desirable to provide a non-fat processed cheese which emulates the body and texture of processed cheese products prepared from natural cheese which contains substantial levels of milk fat. With increasing consumer awareness, the focal point of the food industry is on reducing fat and calorie consumption. Low-fat, low calorie foods, which look and taste similar to their full fat, higher calorie counterparts, are eagerly sought by the consumer. Researchers in the food industry have concentrated on developing food products which are nutritious and palatable and which contain substantially reduced levels of fat containing ingredients. This is particularly true in the dairy industry, where low calorie, low-fat products, such as skim milk, yogurt and reduced fat ice cream have been successfully marketed. The high fat levels associated with processed cheese products have been thought to be necessary to maintain a desirable creamy mouthfeel associated with pasteurized processed cheese products. The combination of high total solids, contributed in part by the high fat content, and the relatively low pH have been necessary to provide shelf stability in shelf-stable, pasteurized process cheese products.

It is a principal object of the present invention to provide a method for producing a non-fat processed cheese from skim milk cheese.

It is another object of the present invention to provide a method for producing a non-fat processed cheese from skim milk cheese which has the body and mouthfeel of processed cheese prepared from natural cheese.

SUMMARY OF THE INVENTION

The present invention is directed to a low-fat processed cheese manufactured from skim milk cheese. In the method of the invention, a mixture of skim milk cheese, a low viscosity bulking agent and an emulsifying salt is provided. The mixture is heated to an elevated temperature of from about 175° F. to about 240° F. The mixture is held at the elevated temperature for a period of from about 0.5 minutes to about 8 minutes to provide a homogeneous molten cheese mass. The cheese mass is then packaged to provide a low fat processed cheese. The low-fat processed cheese of the invention is particularly suitable for the manufacture of processed cheese slices.

As used herein, the term "low viscosity bulking agent" means a levoglucosan having a non-reducing end and having glycosidic bonds $\alpha\text{-}1\rightarrow 4$, $\alpha\text{-}1\rightarrow 6$ and β-1→2, β-1→3 and β-1→6. The structure of levoglucosans has been deduced as being:

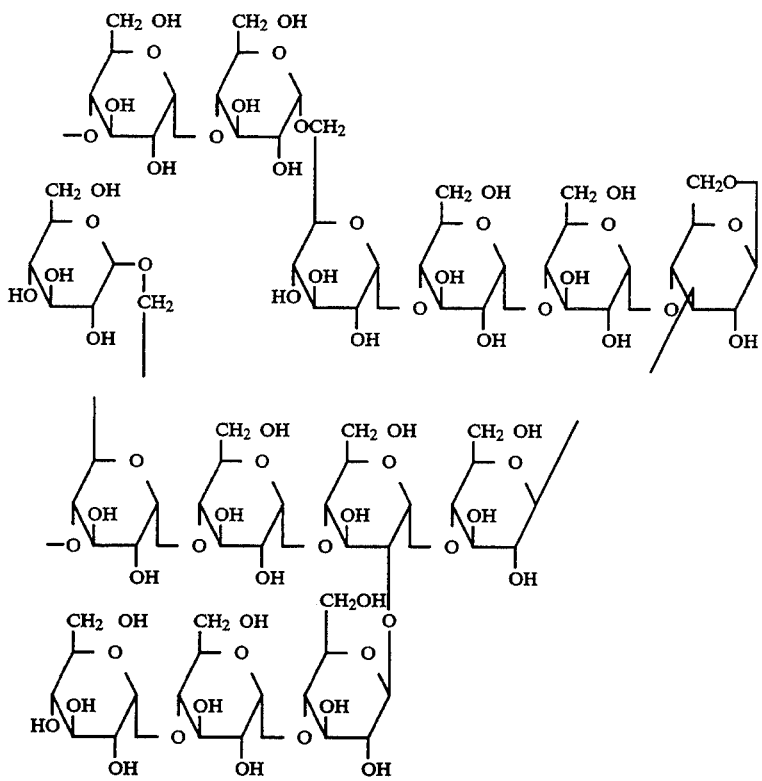

Levoglucosans can be artificially prepared or derived from starch. The levoglucosans useful in the present invention have a low viscosity as a 30% solution of from about 10 to about 20 cps.

DETAILED DESCRIPTION OF THE INVENTION

In the method of the present invention, a processed cheese is manufactured from a skim milk cheese. The term "skim milk cheese for manufacturing" is understood in the industry to mean a cheese made from skim milk which is intended to be used as a component in processed cheese products in combination with fat-containing cheeses such as cheddar cheese and swiss cheese. Skim milk cheese useful in the present invention can be made by a conventional process involving the setting of skim milk with a milk coagulating enzyme and rennet, followed by a whey separation step or can be manufactured by processes which utilize ultrafiltration to concentrate the skim milk followed by evaporation to provide the cheese. The skim milk cheese used in the method of the present invention generally has a moisture content of from about 40% to about 60% moisture. All percentages used herein are by weight, unless otherwise indicated.

In accordance with one process for the manufacture of the skim milk cheese used in the process of the present invention, the skim milk cheese is prepared from a skim milk source which can be selected from skim milk, a skim milk retentate produced by ultrafiltration of skim milk, concentrated skim milk, reconstituted non-fat dry milk or a mixture of any two or more of these with water in a quantity not in excess of that sufficient to reconstitute any concentrated skim milk or non-fat dry milk used to the level of moisture found in whole milk which has had the milkfat separated therefrom, i.e., about 91% moisture. The skim milk source, which may be pasteurized, and which may be warmed is subjected to the action of lactic acid producing bacteria which are either present in the milk or are added thereto. Sufficient rennet or other suitable milk-clotting enzyme is added to the skim milk to set the skim milk to a semi-solid mass. Calcium chloride may also be added in a quantity of not more than 0.02%.

The mass is cut, stirred and heated with continued stirring so as to promote the separation of whey and curd. The whey is drained off and the curd is matted into a cohesive mass. Proteins from the whey may be incorporated into the cheese mass. The mass is cut into slabs which are piled and handled so as to further promote the drainage of whey and the development of acidity. The slabs are then cut into pieces, which may be rinsed by pouring or sprinkling water over them, with free and continuous drainage. The duration of the rinsing is limited so that only the whey on the surface of the curd pieces is removed. The curd is salted, stirred, further drained and pressed into forms. Certain animal or plant enzymes, which are capable of aiding in the curing or development of flavor of the skim milk cheese, may be added during the procedure.

U.S. Patent No. 4,476,143 to Czulak, et al., U.S. Pat. No. 3,156,568 to Hargrove, et al. and U.S. Pat. No. 5,037,659 to Trecker, et al. describe processes for the manufacture of cheese from skim milk. In this connection, the term "skim milk cheese" as used herein is meant a natural cheese prepared from skim milk which has developed some flavor through ripening and which has from about 40% to about 60% moisture.

In accordance with the method of the invention, the skim milk cheese is preferably comminuted to provide particles of skim milk cheese. The skim milk cheese particles are combined with a low viscosity levoglucosan and an emulsifying salt. The mixture of skim milk cheese particles, low viscosity levoglucosan and emulsifying salt is heated to a temperature in the range of from about 175° F. to about 240° F. The mixture is held at the elevated temperature for a period of from about 0.5 minutes at the highest temperature to about 8 minutes at the lowest temperature to provide a homogeneous molten cheese mass. The molten cheese mass is then packaged to provide a low fat processed cheese with body and texture property similar to processed cheese made from natural cheese having a substantial level of milk fat.

The skim milk cheese generally has a moisture content of from about 40% to about 60%. The skim milk cheese is used in the processed cheese of the present invention at a level of from about 20 to about 55%. Water is added in the mixture to provide a total water content in the processed cheese of from about 40 to about 65%. At higher levels of use of the skim milk cheese of from about 30% to about 55%, high temperatures of heating are required to completely melt the skim milk cheese particles. At such high temperatures in the range of from about 215° F. to about 240° F., known bulking agents, such as corn syrup solids cannot be used. Corn syrup solids become overcooked and brown to provide an undesirable flavor and unattractive appearance. In accordance with the present invention, it has been discovered that levoglucosans can be used as a low viscosity bulking agent to provide the desired body and texture of the processed cheese product. Levoglucosans have a non-reducing end and have glycosidic bonds $\alpha$-1→4, $\alpha$-1→6 and $\beta$1→2, $\beta$-1→3 and $\beta$-1→6. The levoglucosans useful in the present invention have a deduced formulation according to the following structure:

The levoglucosans useful in the present invention have a viscosity in the range of from about 10 to about 20 cps as a 30% solution. The levoglucosan is used in the processed cheese products of the present invention at a level of from about 2% to about 12%.

A milk protein source may optionally be present in the processed cheese mixture of the present invention.

The milk protein source useful in the present invention is selected from the group consisting of bakers cheese, dry curd cottage cheese, non-fat dry milk solids, evaporated skim milk and skim milk retentate prepared by membrane treatment of skim milk. The milk protein source should have from about 3% to about 70% of moisture. Dry curd cottage cheese is a well known dairy product, which is a drained, uncreamed skim milk cheese curd made by inoculating skim milk with a lactic culture and allowing the product to coagulate. Dry curd cottage cheese may also be made by a direct acidification method. Generally, dry curd cottage cheese comprises about 20% to 25% by weight of non-fat milk solids and 75% to 80% by weight of water. When used herein, the term "dry curd cottage cheese" refers to a soft cheese curd, such as cottage cheese or bakers cheese curd product having the above solids and moisture characteristics. Concentrated skim milk produced by ultrafiltration, evaporation or by reconstitution of dried skim milk may also be used.

The skim milk cheese and the milk protein source are combined in a suitable apparatus for heating the skim milk cheese and the milk protein source. Prior to being heated, the skim milk cheese is preferably comminuted to provide particles of skim milk cheese having a size of from about 1/16 inch to about ⅜ inch. The skim milk cheese is used at a level of from about 20% to about 55% and the milk protein source, when used, is used at a level of from about 3% to about 30% on a dry solids

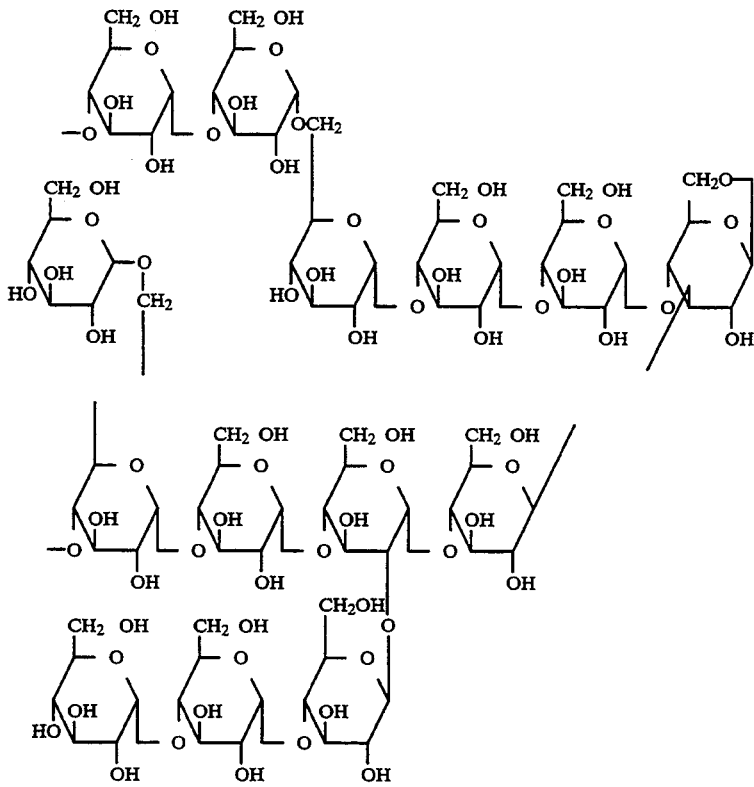

basis. All percentages used herein are by weight of the finished cheese sauce product, unless otherwise specified.

A starch may optionally be present. The starch may be any of the natural, unmodified food grade starches, such as corn starch, tapioca starch, potato starch and rice starch. The starch, if used, may be pregelatinized in accordance with known techniques or may be ungelatinized. The starch is used at a level of from about 1% to about 5%.

Corn syrup solids or maltodextrins may also be used in the processed cheese of the invention when the cooking temperatures are at the lower end of the temperature range, e.g., a temperature of from about 185° F. to about 215° F. Preferably, low DE corn syrups or corn syrup solids are used. By low DE corn syrup is meant those corn syrups having a DE of from about 20 to about 36. Maltodextrins should have a DE of from about 10 to about 20. Such low DE corn syrups have a very high viscosity and relatively low sweetness. The relatively low sweetness is the result of having low levels of reducing sugars, such as dextrose and maltose and relatively high levels of non-reducing sugars such as trisaccharides and higher saccharides. The low DE corn syrup, if used, is preferably used in the compositions of the present invention at a level of from about 2% to about 12%, dry solids basis.

An emulsifying salt is used in the mixture of the present invention for preparing processed cheese products. The emulsifying salts generally prescribed for use in the manufacture of pasteurized processed cheese are useful in the present invention. These emulsifying salts are one or any mixture of two or more of the following: monosodium phosphate, disodium phosphate, dipotassium phosphate, trisodium phosphate, sodium metaphosphate, sodium hexametaphosphate, sodium acid pyrophosphate, tetrasodium pyrophosphate, sodium aluminum phosphate, sodium citrate, potassium citrate, calcium citrate, sodium tartrate and sodium potassium tartrate. The emulsifying salt is used at a level of from about 1.0% to about 3%.

Preservatives, such as sorbic acid, and cheese flavors are optionally present in the mixture of the present invention for preparing processed cheese products.

A polydextrose may optionally be present in the low fat confection products of the invention. Polydextrose is prepared through the polymerization of glucose in the presence of food-acceptable polycarboxylic acid catalysts and polyols. One method for preparation of polydextrose is described in U.S. Pat. No. 4,622,233 to Torres. The polydextrose may be used to replace all or a part of the sugar to provide altered textural characteristics. The sweetening effect of the displaced sugar is provided by use of one or more of the non-nutritive sweeteners.

In the preparation of the processed cheese products of the present invention, the ingredients are combined in a suitable mixture and are agitated to provide a blend. The blend is then processed by transferring the blend through a conduit containing a steam injection nozzle. The mixture of components is rapidly heated by steam injection to a temperature in the range of from about 175° F. to about 215° F. and is maintained at that temperature for a period of from about 0.5 minutes to about 8 minutes. At cooking temperatures below about 215° F., the blend of processed cheese components can be heated to the desired temperature while the mixture is being agitated in a conventional processed cheese laydown cooker. Heating can also be effected at the lower temperatures in a jacketed mixer such as Groen kettle.

The following examples further illustrate various features of the invention, but are not intended to in any way limit the scope of the invention as set forth in the appended claims.

EXAMPLE 1

A processed cheese product was prepared from the components set forth below in Table 1 at the indicated levels:

TABLE 1

| Ingredient | Weight Percent |
| --- | --- |
| Skim milk cheese (564 moisture) | 52.04 |
| Water (added) | 19.25 |
| Non-fat dry milk | 12.78 |
| Corn syrup solids (24 DE) | 4.00 |
| FIBERSOL2 ™ | 7.00 |
| Lactose | 1.23 |
| Sodium Chloride | 1.10 |
| Disodium Phosphate | 2.50 |
| Sorbic Acid | 0.10 |

[1]FIBERSOL2 ™ is a levoglucosan made by Matsutani Chemical Industry Co., Ltd.

The skim milk cheese was comminuted to provide particles approximately ¼ inch in diameter, which were added to a ribbon blender. The remaining components, except for the disodium phosphate were added to the blender and the ingredients were blended. The mixture of ingredients was then transferred through a conduit containing a steam injection nozzle. Steam was used to increase the temperature of the mixture to 220° F. to provide the mixture in a homogeneous molten mass. The molten mass was transferred from the conduit into one pound packages. The processed cheese product produced from the above components had body and mouthfeel similar to that of processed cheese prepared from natural cheese containing a substantial level of fat.

What is claimed is:

1. A method for manufacture of a low-fat cheese comprising
   (a) providing a mixture comprising a skim milk cheese, a low viscosity levoglucosan, whey solids in the range of from 0 to about 8% by weight and an emulsifying salt;
   (b) heating said mixture to an elevated temperature of from about 175° F. to about 240° F.;
   (c) holding said mixture at said elevated temperature for a period of from about 0.5 minutes to about 8 minutes to provide a homogeneous molten cheese mass; and
   (d) packaging said cheese mass to provide a low-fat processed cheese.

2. A method in accordance with claim 1 wherein said skim milk cheese is present at a level of from about 20 to about 55% by weight, said levoglucosan is present at a level of from about 2% to 12% by weight and said emulsifying salt is present at a level of from about 1% to about 3% by weight.

3. A method in accordance with claim 1 wherein said mixture is heated to a temperature of from about 215° F. to about 240° F. for a period of from about 1 to about 3 minutes.

4. A method in accordance with claim 1 wherein milk solids non-fat are present in said mixture at a level of from about 3% to about 30% by weight.

5. A method in accordance with claim 1 wherein corn syrup solids having a DE of from about 20 to about 36 are present in said mixture at a level of from about 1% to about 12% by weight.

6. A method in accordance with claim 1 wherein sodium chloride is present in said mixture at a level of from about 0.5% to about 2% by weight.

7. A method in accordance with claim 1 wherein sorbic acid is present in said mixture at a level of from about 0.05% to about 0.25% by weight.

* * * * *